(12) United States Patent
Furueda et al.

(10) Patent No.: US 8,583,153 B2
(45) Date of Patent: Nov. 12, 2013

(54) RADIO COMMUNICATION SYSTEM, RADIO COMMUNICATION METHOD AND BASE STATION

(75) Inventors: Koichiro Furueda, Yokohama (JP); Tsukasa Sasayama, Yokohama (JP); Mikio Kuwahara, Yokohama (JP); Hajime Kanzaki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 13/241,676

(22) Filed: Sep. 23, 2011

(65) Prior Publication Data

US 2012/0094702 A1    Apr. 19, 2012

(30) Foreign Application Priority Data

Oct. 15, 2010  (JP) ................................. 2010-232085

(51) Int. Cl.
*H04B 15/00* (2006.01)

(52) U.S. Cl.
USPC ....... 455/501; 455/423; 455/63.1; 455/67.13; 370/252; 370/332

(58) Field of Classification Search
USPC ........ 455/452.2, 452.1, 450, 451, 453, 114.2, 455/423, 434, 422.1, 63.1, 512, 67.13; 370/310, 314, 329, 332, 335–337, 252
See application file for complete search history.

(56) References Cited

U.S. PATENT DOCUMENTS

| | | | |
|---|---|---|---|
| 8,385,936 B2* | 2/2013 | Bai et al. ................... | 455/452.2 |
| 2011/0218007 A1* | 9/2011 | Kimura ...................... | 455/512 |
| 2011/0280223 A1* | 11/2011 | Maeda et al. ............... | 370/335 |
| 2012/0045995 A1* | 2/2012 | Nakano et al. .............. | 455/63.1 |
| 2012/0258724 A1* | 10/2012 | Kim et al. ................... | 455/452.2 |
| 2012/0329403 A1* | 12/2012 | Muraoka et al. ........... | 455/67.13 |

OTHER PUBLICATIONS

3GPP TS36.423 V8.9.0 8.3.1 (Load indication), Mar. 2010, pp. 16-17.

* cited by examiner

*Primary Examiner* — Sujatha Sharma
(74) *Attorney, Agent, or Firm* — Mattingly & Malur, PC

(57) ABSTRACT

When DFFR is performed in a heterogeneous environment in which a pico base station coexists in the area of a macro base station and when the pico base station judges that, based on the received-signal quality report result from a mobile terminal, the macro base station causes interference to the pico base station, the pico base station reports an interference power threshold to be notified to the macro base station based on the transmission power setting value of the macro base station, the transmission power setting value of the pico base station, and the estimated interference amount calculated from the scan report result. The macro base station transmits a result of comparison between the transmission powers of multiple frequency resources and the interference power threshold, to the pico base station and the pico base station selects a frequency resource, unlikely to be affected by interference.

8 Claims, 8 Drawing Sheets

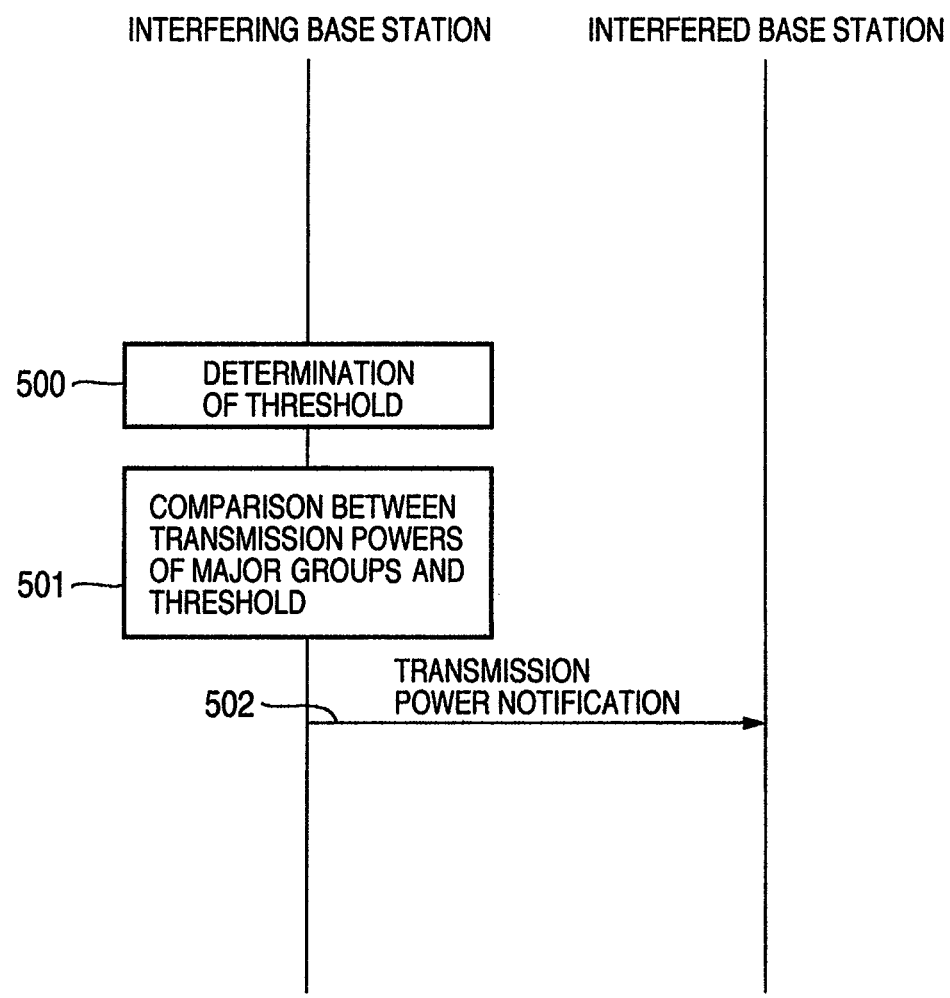

TRANSMISSION POWER NOTIFICATION
[1,0,0,0,0,0]

RADIO COMMUNICATION SYSTEM, RADIO COMMUNICATION METHOD AND BASE STATION

INCORPORATION BY REFERENCE

The present application claims priority from Japanese application JP2010-232085 filed on Oct. 15, 2010, the content of which is hereby incorporated by reference into this application.

BACKGROUND OF THE INVENTION

The present invention relates to a radio communication technology, and more particularly to a technology for reducing interference among base stations in a cellular radio communication system.

In a cellular radio communication system, multiple base stations or antennas are geographically dispersed and a radio communication service area is formed in a range in which the radio waves from the base stations and the antennas are received. A mobile terminal, which is capable of receiving signals from multiple base stations and antennas, is controlled so that the mobile terminal is connected to the base station from which the highest-quality signal is received. A radio communication system provides a mechanism, called a handover, via which a terminal switches the base station, to which it is connected, from one base station to another as the terminal moves, allowing the terminal to maintain the radio communication even when it is moving. To assure the connectivity of a terminal while it is moving, the boundaries of the service areas formed by the base stations and antennas overlap. The signal transmitted from each base station or each antenna, though significant information to a terminal connected to the base station and the antenna, is interference to the communication of a terminal connected to another base station or antenna. Such interference becomes an obstruction to an interfered terminal and results in a reduction in communication quality or throughput.

One known method for reducing interference among base stations is Fractional Frequency Reuse (FFR). This technology provides a mechanism in which multiple base stations and antennas put weight on the transmission power of frequency resources or select frequency resources to allow the usable frequency resources to be shared to prevent the generation of interference.

The technology FFR is based on the premise that mobile terminals are uniformly distributed. Actually, however, the distribution of mobile terminals depends on the factors such as commercial activities with the tendency that the density is high in a specific area. For example, the population density is very high at a major terminal station, but not in the area surrounding the major terminal station. As a result, there is a large difference between the number of terminals in communication with the base station covering a major terminal station and the number of terminals in communication with the base station covering an area surrounding the terminal station. Because of this, FFR that is based on the premise that the distribution of mobile terminals is uniform sometimes does not improve interference.

To achieve fairness for each mobile terminal when the distribution of mobile terminals is very uneven, it is desirable that the base stations surrounding a major terminal station limit the use of a part of frequency resources and that the reduction in interference in the limited frequency be declared to the surrounding base stations. In a part of radio communication systems using a new standard (for example, 3GPP TS36.423 V8.9.0 8.3.1 (Load Indication), hereinafter called Document 1), the interface for transmitting and receiving the information on the interference control among base stations is installed. This mechanism is called Inter Cell Interference Coordination (ICIC). In a radio communication system in which ICIC is installed, the resource state and the interference state must be reported among the base stations. FFR in which ICIC is installed is called Dynamic FFR (DFFR).

SUMMARY OF THE INVENTION

The transmission power control among base stations requires each base station to share the transmission power information with the neighboring base stations. Document 1 describes the following rule, which is to be observed by a transmitting base station, as a mechanism for allowing each base station to share the transmission power information with the neighboring base stations. The rule defined in Document 1 is that a transmitting base station defines, by itself, the threshold that is a transmission power level over which the transmitting base station will cause interference to the neighboring base stations. The transmitting base station compares the transmission power of each major group with the threshold. If the transmission power of a major group exceeds the threshold, the transmitting base station transmits the transmission power notification with the bit set for the major group. In this way, the method described in Document 1 transmits the transmission power notification with the determination information indicating that the transmission power of the major group corresponding to the bit is high and exceeds the interference level, thus notifying the interference control information to the neighboring base stations so that the information is shared.

In a recent radio communication system, attention has been paid to a heterogeneous environment in which base stations having different types or different coverage ranges coexist. In the heterogeneous environment, a low-transmission-power base station, called a pico base station, is sometimes located in an area covered by a high-transmission-power base station called a macro base station. Because a macro base station and a pico base station differ in the base station type and the transmission power level, the threshold of the interference level, of course, differs between them. However, the interference control among the base stations, such as the one described in Document 1, is designed with no consideration for the heterogeneous environment. That is, a transmitting base station establishes an interference level threshold and notifies its neighboring base stations of the established threshold on the premise that the thresholds of interference between base stations are at the same level with each other.

To solve the problems described above, it is an object of the present invention to perform interference control in a heterogeneous environment in which base stations having different types and different transmission power levels coexist and the interference levels, of course, differ among the base stations.

To solve the above problem, the present invention provides a radio communication system comprising at least a first base station that has a first coverage area; and a second base station that has a second coverage area, wherein the first and second base stations are capable of communicating with each other via a wired line, and each of the base stations performs usage frequency resource sharing control by putting weight on, or selecting from, transmission powers of frequency resources generated by dividing a radio resource into a plurality of radio resources. When the second base station judges that, based on a received-signal quality report result received from a mobile terminal, the first base station causes interference to the second base station, the second base station decides an interference power threshold to be notified to the first base station and notifies the interference power threshold to the first base station, wherein the interference power threshold is determined based on a transmission power setting value of the first base station, a transmission power setting value of the second base station, and an estimation amount of interference that the first base station causes to the second base station, and the estimation amount is calculated from a report result from the mobile terminal. The first base station transmits information to the second base station, wherein the information indicates a comparison result between transmission powers of the plurality of frequency resources and the interference power threshold, and based on the comparison result, the second base station selects a frequency resource, unlikely to be affected by interference from the first base station, for communication with the mobile terminal.

More specifically, the interference power threshold decided by the second base station is a value generated by conversion to a transmission power value of the first base station, based on the transmission power setting value of the first base station, the transmission power setting value of the second base station, and a measurement result of the amount of interference that the first base station causes to the second base station, wherein the measurement result is calculated from the report result from the mobile terminal.

The present invention allows for interference control in a heterogeneous environment in which base stations having different types or different transmission powers coexist and the interference level, of course, differs between them.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing the sequence of interference control between conventional base stations.

DETAILED DESCRIPTION OF THE EMBODIMENT

An embodiment of the present invention will be described with reference to the drawings.

Figure 1:
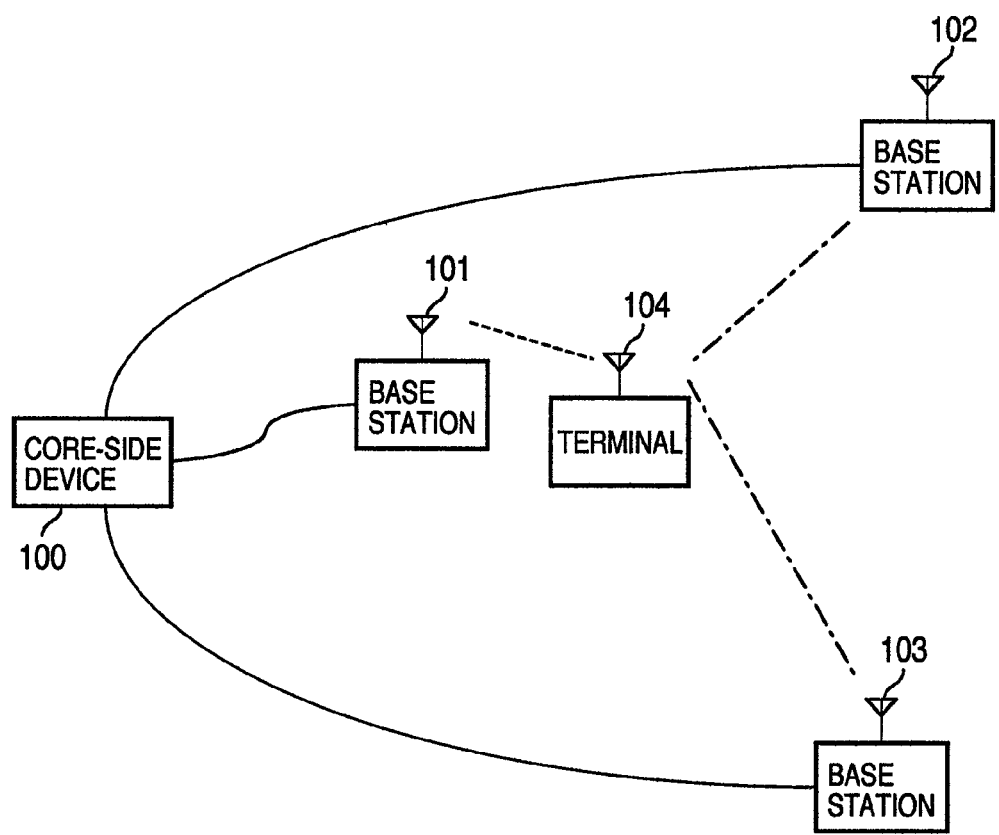
FIG. 1 is a diagram showing an example of the configuration of a radio communication system.

FIG. 1 is a diagram showing an example of the configuration of a radio communication system.

Base stations 101-103 are connected to the core network for data communication with a core-side device 100. The base station 101 converts information, obtained from the core-side device 100, to the high-frequency signal and transmits it to a terminal 104 via a radio signal. The terminal 104 receives the radio signal and performs the signal processing to convert the radio signal to information for carrying out communication with the core-side device 100. On the other hand, information generated by the terminal 104 is converted to the high-frequency signal by the terminal 104 and is transmitted to the base station 101 via a radio signal. The radio signal transmitted by the terminal 104 and received by the base station 101 is converted to information by the signal processing and is transmitted to the core-side device 100.

In the example shown in FIG. 1, multiple base stations 101-103 are connected to the core-side device 100. The base stations 101-103, which are dispersed geographically, transmit signals at different locations. When the terminal 104 receive a signal transmitted by a base station other than the base station 101, the signal transmitted by a base station other than the base station 101 is received by the terminal 104 as an interference wave.

As one method for reducing interference among base stations, FFR is known as described above. FFR in which ICIC is installed is called DFFR wherein ICIC is a mechanism for transmitting and receiving information between base stations for interference control.

Figure 2A:
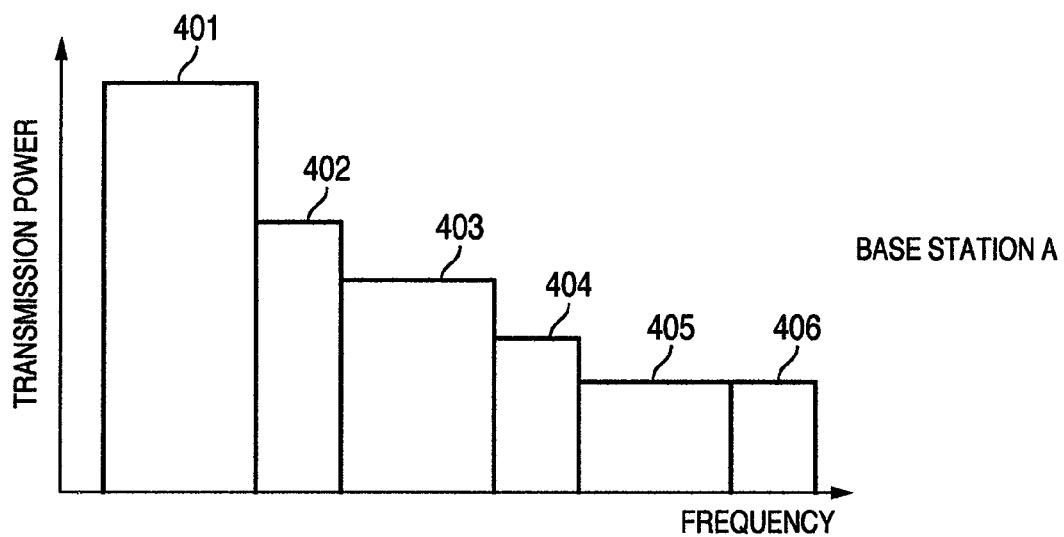
FIGS. 2A and 2B are diagrams showing the transmission power values of the frequency resources of two neighboring base stations.
Figure 2B:
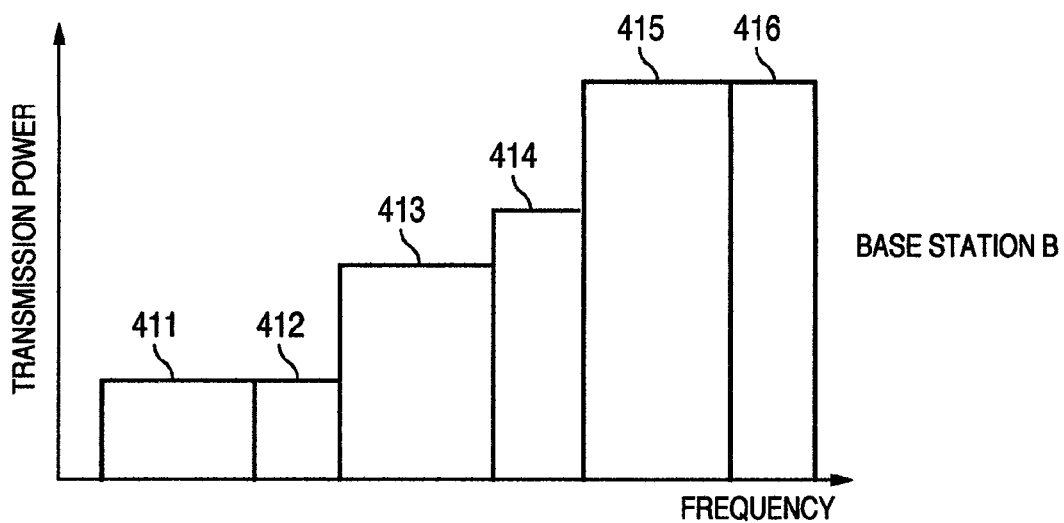

FIGS. 2A and 2B are diagrams showing the transmission power values of the frequency resources of the neighboring two base stations.

The following describes DFFR with reference to FIGS. 2A and 2B.

FIGS. 2A and 2B show an example of the frequency resource state in the base stations to which DFFR is applied.

In FIGS. 2A and 2B, base station A and base station B are adjacent. In FIGS. 2A and 2B, the vertical axis indicates the transmission power and the horizontal axis indicates the frequency. In this embodiment, Worldwide Interoperability for Microwave Access (WiMAX) IEEE802.16e is used as an example. In WiMAX, when the system band is, for example, 10 MHz, the 10-MHz frequency band is divided into six major groups (401-406 or 411-416) as shown in the figures. In this example, the frequency axis is denoted as the logical sequence. In a system where OFDM is used as the modulation method of the radio signal transmitted and received between a base station and a terminal, the frequency is a set of elements called subcarriers that are separated by FFT. A major group described above is composed of a collection of multiple subcarriers. A subcarrier is the minimum unit configured on the frequency axis, and one symbol is transmitted by one subcarrier. In the physical sequence, the logical sequence described above is scrambled by a pseudo-random sequence called Perm base. Physically scrambling the logical sequence in this way prevents only a specific subcarrier from being continuously affected by interference between the neighboring base stations. Because the description of the present invention becomes complex if the physical sequence is used, the following describes the embodiments using the logical sequence.

FIGS. 2A and 2B each show the downlink transmission power of each major group between the two stations, base station A (FIG. 2A) and base station B (FIG. 2B). In base station A, major groups 401 and 402 transmit the signal with a high transmission power. Conversely, in base station B, major groups 411 and 412, which represent frequencies corresponding to the major groups 401 and 402, transmit the signal with a low transmission power.

By putting weight on the transmission power in this way between the neighboring base stations, a terminal located at the cell boundary between base station A and base station B and connected to base station A uses the major group 401 or 402 for communication to make it difficult for the terminal to be affected by the major group 411 or 412 of the neighboring base station B. Similarly, a terminal located at the cell boundary between base station A and base station B and connected to base station B uses the major group 415 or 416 for communication to make it difficult for the terminal to be affected by the major group 405 or 406 of the neighboring base station A.

Figure 4:
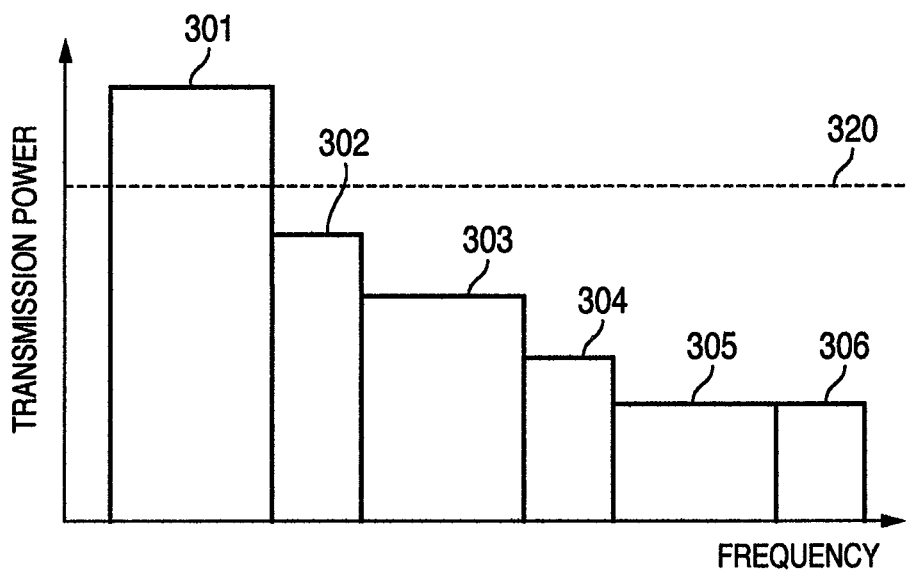
FIG. 4 is a diagram showing the setting of an interference level threshold.

First, with reference to FIG. 3 and FIG. 4, the following describes interference control between base stations described in Document 1.

FIG. 3 is a diagram showing the sequence of interference control between conventional base stations.

In the description below, a base station that is affected by interference is called an interfered base station. A base station that causes interference is called an interfering base station.

In the example in Document 1, an interfering base station that transmits the signal determines, by itself, the threshold (500) that is a transmission power level over which the transmitting base station will cause interference to the neighboring base stations as shown in FIG. 3. The transmitting base station compares the transmission power of each major group with the interference level threshold. If the transmission power of a major group exceeds the threshold, the transmitting base station sets a bit and generates a transmission power notification indicating that the transmission power of the major group corresponding to the bit is high (501). The interfering base station transmits this transmission power notification to the surrounding base stations including the interfered base station (502).

FIG. 4 is a diagram showing the setting of an interference level threshold.

An interfering base station determines, by itself, a threshold 320 that is a transmission power level over which the transmitting base station will cause interference to the neighboring base stations. The transmitting base station compares the transmission power of each major group with the interference level threshold 320. If the transmission power of a major group 301 exceeds the threshold, the transmitting base station sets a bit and generates a transmission power notification indicating that the transmission power of the major group 301 is high.

Next, the following describes a radio communication system in the heterogeneous environment.

Figure 5:
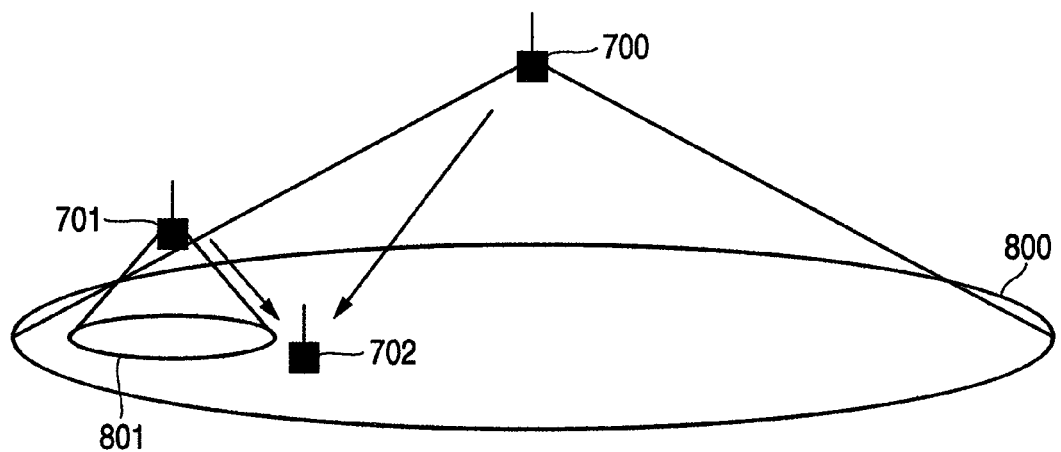
FIG. 5 is a diagram showing a radio communication system in the heterogeneous environment in one embodiment of the present invention.

FIG. 5 is a diagram showing a radio communication system in the heterogeneous environment in one embodiment of the present invention.

Recently, attention has been paid to a heterogeneous environment, sometimes with a low-transmission-power base station configured in the cell (coverage area) of a higher-transmission-power base station.

In the example shown in FIG. 5, a low-transmission-power base station 701, called a pico base station, exists in the coverage area of a high-transmission-power base station 700 generally called a macro base station. Because a macro base station and a pico base station differ in the base station type and the transmission power level, the interference level, a transmission power level over which the base station is affected by interference, differs between the macro base station and the pico base station. This difference requires a mechanism different from the conventional mechanism used in the case in which the transmission power is notified based on the interference level determined by a macro base station that has a higher transmission power. In the embodiment described below, a mechanism for avoiding interference will be described in which an interfered base station sets a transmission power level over which the base station itself will be affected by interference, notifies this transmission power level to the macro base station that is an interfering base station, and receives a response to the notification from the macro base station.

First, the following describes the configuration of a base station.

Figure 6:
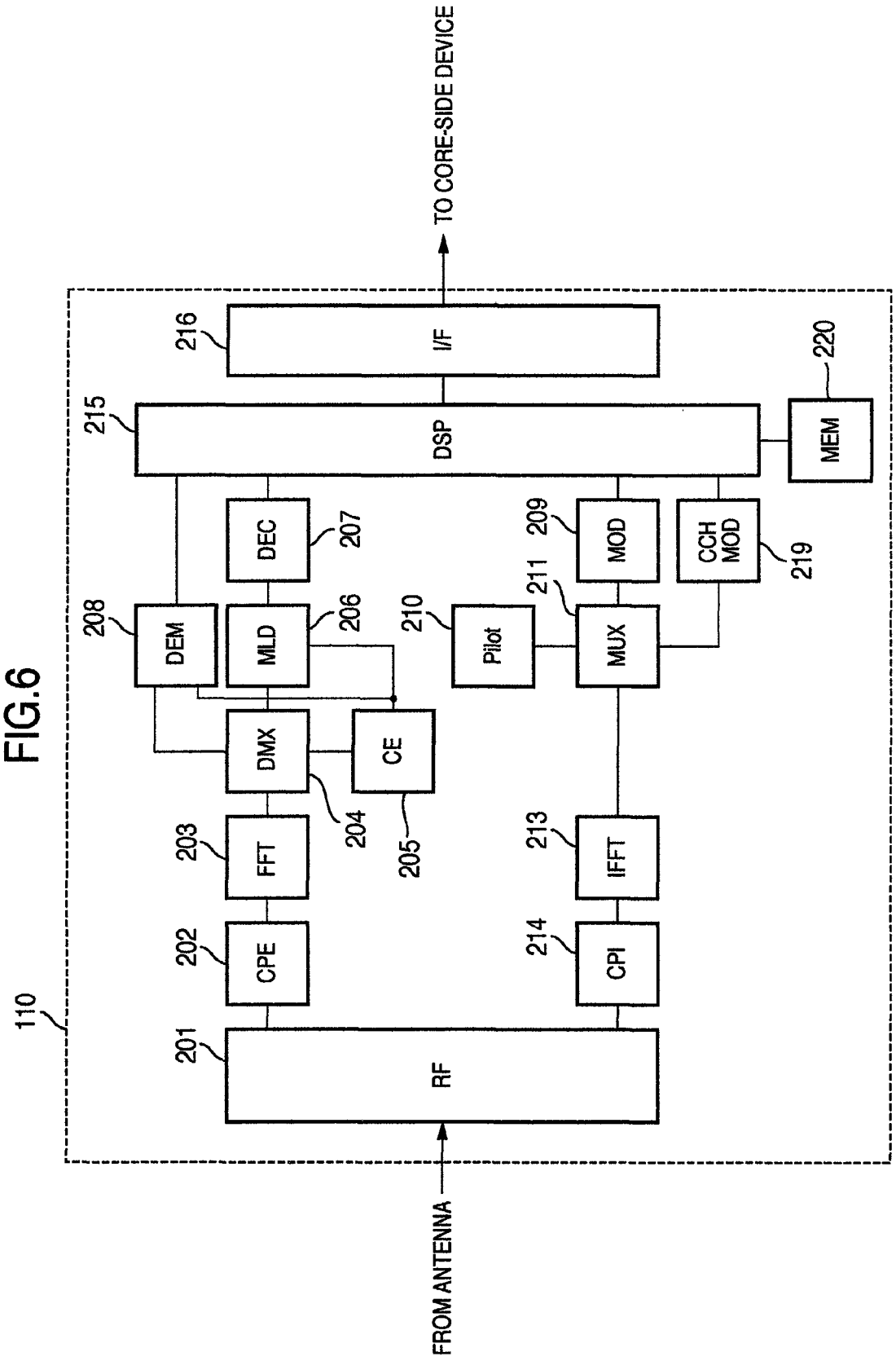
FIG. 6 is a diagram showing the configuration of a base station in one embodiment of the present invention.

FIG. 6 is a diagram showing the configuration of a base station in one embodiment of the present invention.

FIG. 6 is a diagram showing an example of the configuration of a base station 110 that uses Orthogonal Frequency Division Multiple Access (OFDMA). The creation of the signaling, one of the features of this embodiment, is implemented in a DSP 215. First, the signal received by an antenna (not shown) is input to an RF unit 201 and converted to the digital signal. The signal converted to the digital signal format has the CP removed by a Cyclic Prefix Extraction (CPE) unit 202 at the time dependent on the base station. The CP, an abbreviation for Cyclic Prefix, is added to an OFDM signal to remove the effect of a delayed wave. The CPE unit 202 removes the CP and performs the pre-processing before Fast Fourier Transform (FFT) is performed. An FFT unit 203 performs FFT for the received signal from which the CP is removed. The time domain signal is transformed to the frequency domain signal by the FFT and separated into information on a subcarrier basis. A demultiplexing (DMX) unit 204 identifies the received signal as the information divided by frequency×time, and demultiplexes the signal into channels according to the resource allocation determined by the scheduler implemented in the Digital Signal Processor (DSP) unit 215. The signal is divided primarily into the pilot signal, control signal, and user data signal. The pilot signal (or reference signal) is transmitted to a Channel Estimation (CE) unit 205 for estimating the propagation line.

The control signal is transmitted to a Demodulation (DEM) unit 208 and is demodulated by Minimum Mean Square Error (MMSE) or a similar method using the propagation estimation result calculated by the CE unit 205 for decoding the propagation line coding. The information transmitted from the terminal as the control signal includes ACK/NACK indicating whether the downlink packet transmission is successful, Carrier to Interference-plus-Noise Ratio (CINR) of the base station and Received Signal Strength Indictor (RSSI) of the reception signal power measured by the terminal, and the reception level of the neighboring base stations used for a handover. The control information generated by the decoding is accumulated in a memory 220 of the DSP unit 215 for use in supporting the scheduler implemented in the DSP unit 215.

The user data signal is transmitted to a Maximum Likelihood detection (MLD) unit 206 where Maximum Likelihood detection (MLD) is performed using the propagation line estimation result calculated by the CE unit 205. The likelihood ratio calculated by the MLD unit 206 is input to a Decoding (DEC) unit 207 where the turbo decoding processing is performed by the DEC unit 207. The obtained information is input to the DSP unit 215 where the layer 2 processing is performed and, via a network interface 216, transmitted to a core-side device not described here.

Information transmitted from the core-side device is recorded in the memory 220 via the network interface 216, the appropriate resources are allocated to the information by the scheduler implemented in the DSP unit 215 and, based on the result, and the information is modulated and transmitted via the antenna. The user data information received in the memory 220 is retrieved by an instruction from the scheduler and, for the retrieved information, the encoding processing, such as turbo coding and interleaving, and the modulation processing, such as Quadrature Phase Shift Keying (QPSK) coding, are performed by a Modulation (MOD) unit 209. The modulated information is allocated to the scheduler-instructed resources by a Multiplexing unit (MUX) 211. At this time, the pilot generated by a pilot generation unit (Pilot) 210 and the control channels created by a control channel modulation unit (CCHMOD) 219 are allocated together. The transmission power of each major group is set to the transmission power defined by the DSP. The information transmitted via the control channel is created by the DSP unit 215 and is modulated by the control channel modulation unit 219. The transmission information multiplexed by the MUX 211 is converted to the time domain information by an IFFT unit 213. The transmission information, to which the CP is added by a Cyclic Prefix Insertor (CPI) unit 214, is input to the RF unit 201. The transmission information is converted from the digital signal to the high-frequency signal, and then amplified, by the RF unit 201 and is output to the antenna not shown.

In the description below, reference is made again to FIG. 5.

FIG. 5 is a diagram showing an example of the heterogeneous environment in which the coverage area of a macro base station and the coverage area of a pico base station overlap. There are a macro cell 800 of the large-transmission-output macro base station 700 and a pico cell 801 of the small-transmission-output pico base station 701. A terminal (mobile terminal) 702 is in the boundary between both cells.

If a terminal is located at a midpoint between the conventional non-heterogeneous macro base stations, the signals are transmitted from the two macro base stations at an almost equal transmission power level. Therefore, there is no problem with the power control between the base stations shown in FIG. 2 to FIG. 4 even if the power control rule on an equal basis, such as that disclosed in Document 1, is used.

However, the transmission power from the antenna differs greatly between the macro base station and the pico base station in the heterogeneous state shown in FIG. 5. Therefore, the condition differs between the case in which the macro base station is an interfering base station and the pico base station is an interfered base station and the case in which the pico base station is an interfering base station and the macro base station is an interfered base station. The macro base station has a significant effect on the pico base. Therefore, even if the macro base station slightly reduces the transmission power of a particular major group in order to reduce interference between macro base stations at the level of macro base stations, the interference power to a terminal connected to the pico base station is still high. That is, the effect of the power strength that an interfering base station has on an interfered base station depends largely on the type and the transmission power strength of the interfering base station and the interfered base station as well as on the location of the base stations. To solve this problem, the present invention provides a mechanism that allows an interfered base station to notify an interference power level. The following describes this mechanism using the interference control sequence.

Next, the following describes the sequence of interference control between base stations in one embodiment of the present invention.

Figure 7:
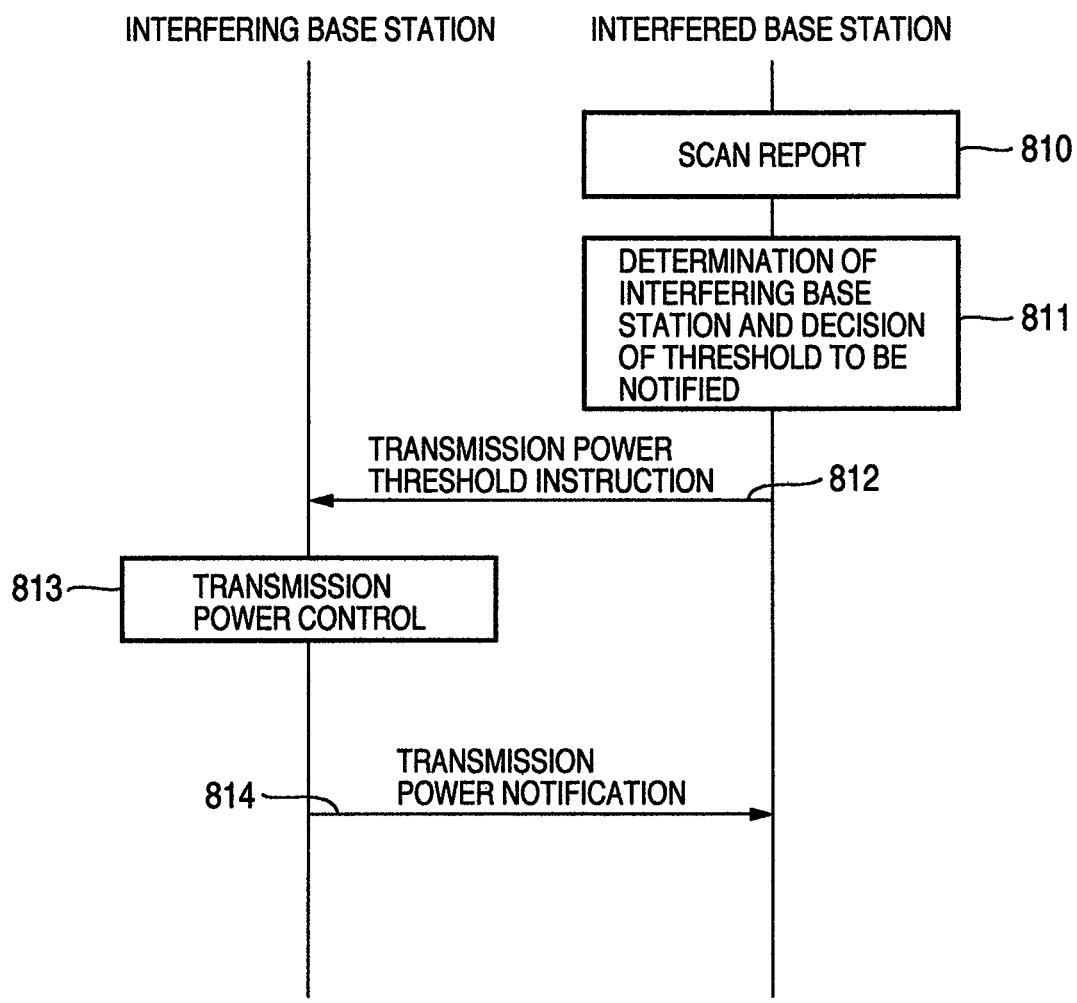
FIG. 7 is a diagram showing the sequence of interference control processing between base stations in one embodiment of the present invention.

FIG. 7 is a diagram showing the sequence of interference control processing between base stations in one embodiment of the present invention.

In FIG. 7, the interfered base station first performs the scan report operation (810) to cause a terminal, one of the terminals connected to the interfered base station and affected most by interference in the cell boundary, to report on Received Signal Strength Indictor (RSSI) and Carrier/Interference (C/I) of the interfering base station to check if there is interference.

The interfered base station compares the result of the scan report operation with a predetermined threshold to determine the interfering base station. Alternatively, the interfered base station observes the packet error rate of the terminal, recognizes that the packet error rate is high even when a coding method with CINR equal to or higher than the expected value is used, and identifies that interference is generated. After that, it may be determined that a base station, whose power received and detected by the terminal during the scan report operation is high, is the interfering base station. In this way, based on the result of the scan report operation and the packet error rate, the interfered base station determines the base station from which strong interference is received and, considering the transmission output of the interfered base station itself, decides the transmission power threshold to be notified to the interfering base station (811). In the radio communication system assumed in this embodiment, each base station has a mechanism for notifying about the transmission power setting value (as shown in step 814 that follows). The interfered base station stores in advance the transmission power setting values received from the neighboring base stations. The interfered base station has the list containing the information indicating the relation between the base stations and the transmission power values of the signals received from those base stations. In step 811, the interfered base station identifies the transmission power value of the determined interfering base station by referencing this list. Based on the transmission power of the interfering base station, the transmission power of the interfered base station itself, and the measurement result of the amount of received interference, the interfered base station decides the transmission power threshold to be notified to the interfering base station by conversion to the transmission power value of the interfering base station. The interfered base station transmits the transmission power threshold, decided in step 811, to the interfering base station (812).

On the other hand, the interfering base station that receives the transmission power threshold instruction from the interfered base station accumulates the value in the memory. The interfering base station performs the usual transmission power control (813) at a regular time interval using, for example, a timer. The interfering base station compares the transmission power of each major group, determined by the transmission power control in step 813, with the transmission power instruction threshold accumulated in the memory and received from one or more interfered base stations. If there is a major group whose transmission power is higher than the transmission power instruction threshold as a result of the comparison, the interfering base station sets the bit of the transmission power notification bit string to 1, as shown at the bottom of FIG. 4, to indicate that the transmission power of the major group is higher than the transmission power threshold instruction value. After that, the interfering base station reports the determination result of the six bits, one for each of the major groups, to the interfered base station. In the example in FIG. 4, the transmission power threshold instruction value is indicated by the reference numeral 320. Of the six major groups 301-306, the transmission power of the major group 301 is higher than the transmission power threshold instruction value indicated by the reference numeral 320. In this case, the bit string [1,0,0,0,0,0] and the transmission power setting values of the major groups are transmitted to the interfered base station by a transmission power notification 814. The interfered base station receives and stores this transmission power notification and, at the same time, identifies, from this bit string, which major group is unlikely to be affected by interference from the interfering base station. By identifying the major group unlikely to be affected by interference in this way, the interfered base station can schedule the transmission of signals to a terminal using a frequency unlikely to be affected by interference. This method allows the transmission power to be shared considering the different degrees of interference dependent on the output of the interfered base station.

The following describes the scan report operation.

Figure 8:
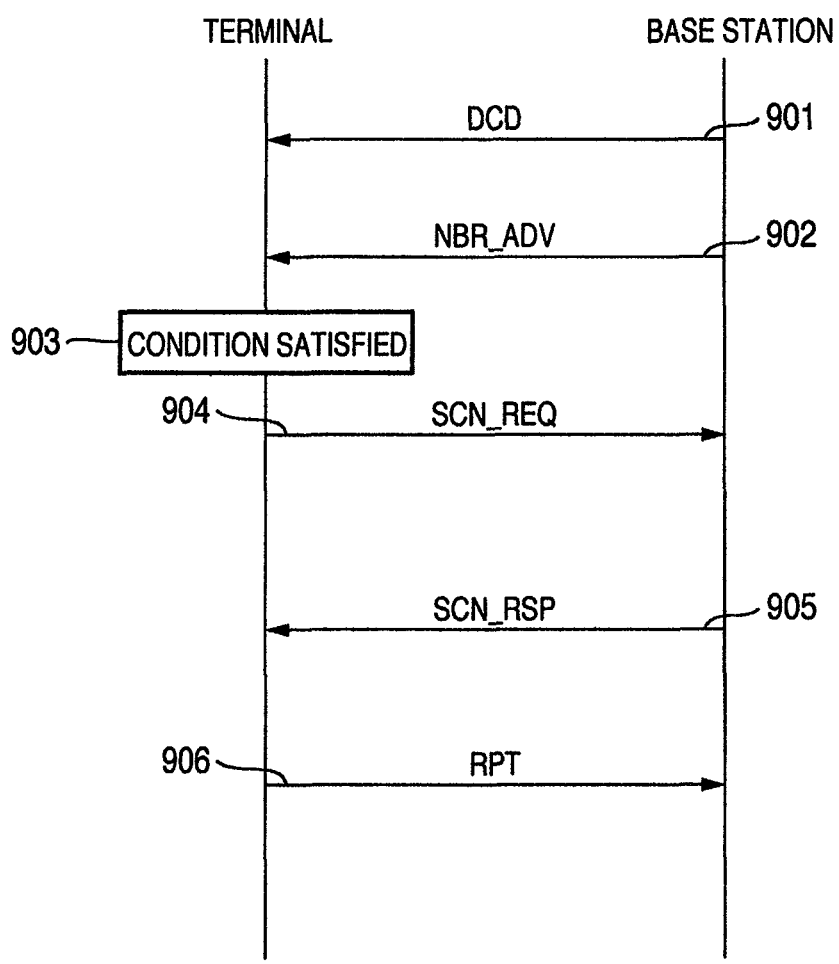
FIG. 8 is a diagram showing the sequence of the scan report operation.

FIG. 8 is a diagram showing the sequence of the scan report operation between a terminal and a base station.

First, the base station transmits an instruction, which specifies the method of the scan report operation, to the terminal via DCD (Downlink Channel Descriptor, downlink channel notification information) message 901. For example, the instruction specifies the measurement frequency of RSSI (Received Signal Strength Indicator, received signal strength) and CINR (Carrier to Interference-plus-Noise Ratio, carrier to interference noise power ratio). The measurement condition for the scan is also specified by DCD 901. As the measurement condition, the comparison method and the threshold for RSSI and CINR, which are measuring results, are specified. The comparison method is, for example, the comparison between RSSI and the threshold or the comparison method for checking if the difference between CINR of the currently connected base station and CINR of a neighboring base station is equal to or smaller than the threshold that is set. The neighboring base stations to be measured are specified by an NBR_ADV (neighbor notification information) message 902. The terminal receives the preamble of a base station specified by the NBR_ADV message and measures RSSI of the neighboring base station and CINR of the preamble. The terminal compares the measurement result with the specified measurement condition (903) and, if the condition is satisfied, transmits SCN_REQ (scan request) 904 to the base station. The base station that receives SCN_REQ transmits SCN_RSP (scan response) 905 to the terminal. The base station transmits SCN_RSP (scan response) to the terminal to request the terminal to return the report measured for the neighboring base stations. The terminal, which receives SCN_RSP, performs the scan operation, and the terminal requested to return the report reports the scan result according to the instruction (906).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system comprising at least:
a first base station that has a first coverage area; and
a second base station that has a second coverage area,
said first and second base stations being capable of communicating with each other via a wired line wherein
each of said base stations performs usage frequency resource sharing control by putting weight on, or selecting from, transmission powers of frequency resources generated by dividing a radio resource into a plurality of radio resources, and
when said second base station judges that, based on a received-signal quality report result received from a mobile terminal, said first base station causes interference to said second base station,
said second base station decides an interference power threshold to be notified to said first base station and notifies the interference power threshold to said first base station, the interference power threshold determined based on a transmission power setting value of said first base station, a transmission power setting value of said second base station, and an estimation amount of interference that said first base station causes to said second base station, the estimation amount calculated from a report result from said mobile terminal,
said first base station transmits information to said second base station, the information indicating a comparison result between transmission powers of said plurality of frequency resources and the interference power threshold, and
based on the comparison result, said second base station selects a frequency resource, unlikely to be affected by interference from said first base station, for communication with the mobile terminal.

2. The radio communication system according to claim 1 wherein the second coverage area is smaller than the first coverage area and the second coverage area is included in the first coverage area.

3. The radio communication system according to claim 1 wherein the interference power threshold decided by said second base station is a value generated by conversion to a transmission power value of said first base station, based on the transmission power setting value of said first base station, the transmission power setting value of said second base station, and a measurement result of the amount of interference that said first base station causes to said second base station, the measurement result calculated from the report result from the mobile terminal.

4. A radio communication method for use in a radio communication system comprising at least:
a first base station that has a first coverage area; and
a second base station that has a second coverage area,
said first and second base stations being capable of communicating with each other via a wired line wherein
each of said base stations performs usage frequency resource sharing control by putting weight on, or selecting from, transmission powers of frequency resources generated by dividing a radio resource into a plurality of radio resources, and
when said second base station judges that, based on a received-signal quality report result received from a mobile terminal, said first base station causes interference to said second base station,
said radio communication method comprises the steps of:
deciding, by said second base station, an interference power threshold to be notified to said first base station and notifying the interference power threshold to said first base station, the interference power threshold determined based on a transmission power setting value of said first base station, a transmission power setting value of said second base station, and an estimation amount of interference that said first base station causes to said second base station, the estimation amount calculated from a report result from said mobile terminal;
transmitting, by said first base station, information to said second base station, the information indicating a comparison result between transmission powers of said plurality of frequency resources and the interference power threshold; and
based on the comparison result, selecting, by said second base station, a frequency resource, unlikely to be affected by interference from said first base station, for communication with the mobile terminal.

5. The radio communication method according to claim 4 wherein the second coverage area is smaller than the first coverage area and the second coverage area is included in the first coverage area.

6. The radio communication method according to claim 5 wherein the interference power threshold decided by said second base station is a value generated by conversion to a transmission power value of said first base station, based on the transmission power setting value of said first base station, the transmission power setting value of said second base station, and a measurement result of the amount of interference that said first base station causes to said second base station, the measurement result calculated from the report result from the mobile terminal.

7. A base station for use in a radio communication system comprising a plurality of base stations each communicating with mobile terminals wirelessly, wherein said base stations are capable of communicating with each other via a wired line, each of said base stations performs usage frequency resource sharing control by putting weight on, or selecting from, transmission powers of frequency resources generated by dividing a radio resource into a plurality of radio resources, and each of said base stations notifies a transmission power setting value to a neighboring base station, said base station comprising at least:
a memory; and
a communication control unit wherein a transmission power setting value of a neighboring base station, notified from the neighboring base station, is stored in said memory and, when said communication control unit judges that, based on a received-signal quality report result received from a mobile terminal, the neighboring base station causes interference, said base station decides an interference power threshold to be notified to said neighboring base station and notifies the interference power threshold to said neighboring base station, the interference power threshold determined based on a transmission power setting value of said neighboring base station, a transmission power setting value of said base station itself, and an estimation amount of interference received from said neighboring base station, the estimation amount of interference calculated from a report result from said mobile terminal, and receives information from said neighboring base station, the information indicating a comparison result between transmission powers of said plurality of frequency resources and the interference power threshold and, based on the information, selects a frequency resource, unlikely to be affected by interference from said neighboring base station, for communication with the mobile terminal.

8. The base station according to claim 7 wherein the interference power threshold is a value determined by conversion to a transmission power value of said neighboring base station.

* * * * *